US005619352A

United States Patent [19]
Koch et al.

[11] Patent Number: 5,619,352
[45] Date of Patent: Apr. 8, 1997

[54] LCD SPLAY/TWIST COMPENSATOR HAVING VARYING TILT AND /OR AZIMUTHAL ANGLES FOR IMPROVED GRAY SCALE PERFORMANCE

[75] Inventors: Gene C. Koch, Swisher, Iowa; Bruce K. Winker, Moorpark; William J. Gunning, III, Newbury Park, both of Calif.

[73] Assignee: Rockwell International Corporation, Seal Beach, Calif.

[21] Appl. No.: 690,033

[22] Filed: Jul. 31, 1996

Related U.S. Application Data

[63] Continuation of Ser. No. 313,476, Sep. 30, 1994, abandoned, which is a continuation-in-part of Ser. No. 223,251, Apr. 4, 1994, Pat. No. 5,504,603.

[51] Int. Cl.$^6$ .................. G02F 1/1333; G02F 1/1335; G02F 1/13
[52] U.S. Cl. .................. 349/89; 349/117; 349/119; 349/177
[58] Field of Search .................. 359/73, 53, 93, 359/102, 51, 52, 63, 499

[56] References Cited

U.S. PATENT DOCUMENTS

| 4,813,770 | 3/1989 | Clerc et al. | 359/73 |
|---|---|---|---|
| 5,124,824 | 6/1992 | Kozaki et al. | 359/73 |
| 5,126,868 | 6/1992 | Kizaki et al. | 359/73 |
| 5,184,237 | 2/1993 | Iimura et al. | 359/63 |
| 5,189,538 | 2/1993 | Arakawa | 359/73 |
| 5,196,953 | 3/1993 | Yeh et al. | 359/73 |
| 5,375,006 | 12/1994 | Haas | 359/73 |
| 5,460,748 | 10/1995 | Mazaki et al. | 359/73 |

FOREIGN PATENT DOCUMENTS

| 0423881A1 | 4/1991 | European Pat. Off. |
| 0529813A2 | 3/1993 | European Pat. Off. |
| 0576931A3 | 1/1994 | European Pat. Off. |

OTHER PUBLICATIONS

"Liquid Crystal TV Displays: Principles and Applications of Liquid Crystal Displays," E. Kaneko, KTH Scientific Publishers, Tokyo, Japan, 1987.

Emsworth, "Achromatic Retardation Layers Based on Anisotropic Polymer Networks," Research Disclosure, No. 337, 1992, p. 411.

Aoki, "Liquid Crystal Display Device," Patent Abstracts of Japan, vol. 12, 413, 1988, p. 780.

*Primary Examiner*—William L. Sikes
*Assistant Examiner*—Walter J. Malinowski
*Attorney, Agent, or Firm*—Gregory G. Williams; M. Lee Murrah; George A. Montanye

[57] ABSTRACT

A twisted/splayed O-plate compensation device, in accordance with the invention, is comprised of an organic liquid crystal polymer thin film and possibly one or more other birefringent layers. The O-plate thin film is a birefringent medium with its optical symmetry axis, on average, oriented obliquely with the surface of the film. Within this constraint, the direction of the material's optical symmetry axis is allowed to vary continuously along the axis normal to the film surface. Such films may be fabricated by applying thin layers of chiral doped nematic or semectic liquid crystal monomer solutions in inert solvents to transparent substrates. The carrier solvents are then evaporated and the monomers polymerized by UV irradiation. Compensation devices may also be comprised of multiple layers of twisted/splayed O-plate material in conjunction with A-plates, C-plates, and simple O-plates. Fabrication techniques for twisted/splayed O-plates are described.

29 Claims, 13 Drawing Sheets

LCD SPLAY/TWIST COMPENSATOR HAVING VARYING TILT AND /OR AZIMUTHAL ANGLES FOR IMPROVED GRAY SCALE PERFORMANCE

REFERENCES

This application is a continuation of application Ser. No. 08/313,476 filed Sep. 30, 1994, now abandoned, which is a continuation-in-part application of U.S. patent application, Ser. No. 223,251, filed Apr. 4, 1994, now U.S. Pat. No. 5,504,603, entitled "Optical Compensator for Improved Gray Scale Performance in Liquid Crystal Display."

BACKGROUND OF THE INVENTION

This invention is concerned with the design of liquid crystal displays (LCDs) and, more particularly, with techniques for maximizing the field of view of such displays by maintaining a high contrast ratio and minimal variance in relative gray levels over a wide range of viewing angles. These goals are achieved through the fabrication and manufacture of LCDs using O-plate technology.

2.1 LCD Technology Overview

Liquid crystals are useful for electronic displays because polarized light traveling through a liquid crystal layer is affected by the layer's birefringence, which can be changed by the application of a voltage across the layer. By using this effect, the transmission or reflection of light from an external source, including ambient light, can be controlled with much less power than is required for the luminescent materials used in other types of displays. As a result, liquid crystal displays are now commonly used in a wide variety of applications, such as, for example, digital watches, calculators, portable computers, and many other types of electronic equipment. These applications highlight some of the advantages of LCD technology including very long operational life in combination with very low weight and low power consumption.

The information content in many liquid crystal displays is presented in the form of multiple rows of numerals or characters, which are generated by segmented electrodes deposited in a pattern on the display. The electrode segments are connected by individual leads to electronic driving circuitry. By applying a voltage to the appropriate combination of segments, the electronic driving circuitry controls the light transmitted through the segments.

Graphic and television displays may be achieved by employing a matrix of pixels in the display which are energized by an X-Y sequential addressing scheme between two sets of perpendicular conductors. More advanced addressing schemes, applied predominantly to twisted nematic liquid crystal displays, use arrays of thin film transistors to control driving voltages at the individual pixels.

Contrast and stability of relative gray scale intensities are important attributes in determining the quality of a liquid crystal display. The primary factor limiting the contrast achievable in a liquid crystal display is the amount of light which leaks through the display in the dark state. In addition, the contrast ratio of the liquid crystal device also depends on the viewing angle. The contrast ratio in a typical liquid crystal display is a maximum only within a narrow viewing angle centered near normal incidence and drops off as the angle of view is increased. This loss of contrast ratio is caused by light leaking through the black state pixel elements at large viewing angles. In color liquid crystal displays, such leakage also causes severe color shifts for both saturated and gray scale colors.

The viewing zone of acceptable gray scale stability in a typical prior art twisted nematic liquid crystal display is severely limited because, in addition to color shifts caused by dark state leakage, the optical anisotropy of the liquid crystal molecules results in large variations in gray level transmission, i.e., a shift in the brightness-voltage curve, as a function of viewing angle. The variation is often severe enough that, at extreme vertical angles, some of the gray levels reverse their transmission levels. These limitations are particularly important for applications requiring a very high quality display, such as in avionics, where viewing of cockpit displays from both pilot and copilot seating positions is important. Such high information content displays require that the relative gray level transmission be as invariant as possible with respect to viewing angle. It would be a significant improvement in the art to provide a liquid crystal display capable of presenting a high quality, high contrast image over a wide field of view.

FIGS. 1a and 1b show a conventional normally, white, twisted nematic liquid crystal display 100 including a polarizer 105 and an analyzer 110. The polarizer 105 and the analyzer 110 are each bonded to glass substrates (not shown), such that the polarization axis of the analyzer 110 is perpendicular to that of the polarizer 105. The figures also show a light source 130 and a viewer 135.

An area between the polarizer 105 and the analyzer 110 contains a nematic liquid crystal material. The nematic phase is a fluid state of matter whose constituent molecules show long range correlation of their angular orientation (they are contained to have their long axes generally be parallel to one another), but no long range correlation of their positions in space as would be the case in a crystalline solid. The average orientation of the nematic molecules' long axes at any point in the material is called the director.

In the normally white configuration of FIGS. 1a and 1b, a "nonselect" area 115 (no applied voltage) appears light, while a "select" area 120 (those which are energized by an applied voltage) appear dark. In the nonselect area 115 the liquid crystal molecules are constrained to adopt the helical structure shown in the figure with their molecular long axes parallel to the glass substrates. In the select area 120 the liquid crystal molecules tend to tilt and rotate toward alignment with the applied electric field. The alignment state with the liquid crystal molecules' long axes normal to the surfaces of the glass substrates is termed a homeotropic alignment. In practical twisted nematic displays the applied electric fields are not strong enough to yield completely homeotropic alignment.

Many of the materials discussed in this document are birefringent. That is to say, they have varying indices of refraction depending on the direction of the electric vector of the light propagating through the material. The index of refraction is the ratio of the speed of light in a vacuum to that in the material. Materials such as liquid crystals that have different optical properties along different axes are said to be optically anisotropic. Materials without such angular variation are said to be isotropic. A uniaxial optical material has only one axis, the extraordinary axis, along which the electric vector of light interacts to yield a unique index of refraction ($n_e$). This index will either be the highest or lowest found in the material. In a uniaxial material all possible axes perpendicular to the extraordinary axis will yield the same index of refraction (called the ordinary index, $n_o$) for light whose electric vector lies in those directions; the material has ellipsoidal symmetry. If the extraordinary axis has the highest associated refractive index value of any axis the material is said to be positively birefringent. If it has the lowest refractive index, the material is said to be negatively birefringent. Light traversing a material such that its electric vector has components along both ordinary and extraordinary axes will have one polarized component retarded in its velocity as compared to the other. If a material has a unique axis which is associated with the highest refractive index, but the axes perpendicular to it have associated refractive indices which differ one to the other, the material is said to be optically biaxial and we will refer to the axis with the associated highest index as the principal optic axis. In this document the term "optical symmetry axis" will be defined to mean the extraordinary axis in uniaxial materials and the principal optic axis in biaxial materials.

Because the liquid crystals used for twisted nematic displays exhibit positive birefringence, the homeotropic alignment state would exhibit the optical symmetry of a positively birefringent C-plate. As is well known in the art, a C-plate is a uniaxial birefringent plate with its extraordinary axis (i.e., its optic or c-axis) perpendicular to the surface of the plate (parallel to the direction of normally incident light). In the select state, the liquid crystal in a normally white display would thus appear isotropic to normally incident light, which would be blocked by the crossed polarizers.

One reason for the loss of contrast with increased viewing angle which occurs in a normally white display is that a homeotropic liquid crystal layer will not appear isotropic to off-normal light. Light propagating through the layer at off-normal angles appears in two modes due to the birefringence of the layer; a phase delay is introduced between those modes and increases with the incident angle of the light. This phase dependence on incidence angle introduces an ellipticity to the polarization state which is incompletely extinguished by the second polarizer, giving rise to light leakage. To correct for this effect, an optical compensating element must also have C-plate symmetry, but with negative birefringence ($n_e < n_o$). Such a compensator will introduce a phase delay opposite in sign to the phase delay caused by the liquid crystal layer, thereby restoring the original polarization state and allowing light passing through energized areas of the layer to be blocked more completely by the output polarizer. C-plate compensation, however, does not impact the variation of gray scale with viewing angle, which is addressed by the present invention.

FIG. 2 depicts the coordinate system which is used to describe the orientation of both liquid crystal and birefringent compensator optic axes. Light propagates toward the viewer 200 in the positive z direction 205 which, together with the x-axis 210 and the y-axis 215, form a right-handed coordinate system. Backlighting is provided, as indicated by the arrows 220, from the negative z direction. The polar tilt angle θ 225 is defined as the angle between the liquid crystal optic axis Ĉ 230 and the x-y plane, measured from the x-y plane. The azimuthal or twist angle Φ 235 is measured from the x-axis to the projection 240 of the optic axis onto the x-y plane.

2.2 Normally White Twisted Nematic LCDs

FIG. 3 is a cross-sectional schematic view of a prior art twisted nematic, transmissive type normally white liquid crystal display. The display includes a polarizer layer 300 and an analyzer layer 305, between which is positioned a liquid crystal layer 310, consisting of a liquid crystal material in the nematic phase.

It is convenient in describing the orientation of various compensation elements of the display to refer to a normal axis perpendicular to the display, which is depicted by a dashed line 370. In the case of a normally white display, the polarizer 300 (with a polarization direction in the plane of the drawing 315) and the analyzer 305 (with a polarization direction into the plane of the drawing 320) are oriented with their polarization directions at 90° to one another. (A polarizer 300 and an analyzer 305 both polarize electromagnetic fields. Typically, however, the term 'polarizer' refers to a polarizer element that is closest the source of light while the term 'analyzer' refers to a polarizer element that is closest the viewer of the LCD.) The liquid crystal layer 310 is sandwiched between a pair of glass plates or substrates 340 and 345. A first transparent electrode 325 and a second transparent electrode 330 are positioned on the glass substrates 340 and 345 adjacent to opposite surfaces of the liquid crystal layer 310 so that a voltage can be applied, by means of a voltage source 335, across the liquid crystal layer. As is explained below, the inner surfaces 346 and 347 of the glass plates 340 and 345 and the transparent electrodes 325 and 330, which are proximate to the liquid crystal layer 310, can be physically or chemically treated to effect the desired liquid crystal orientation.

As is well known in the LCD art (see, e.g., Kahn, The Molecular Physics of Liquid—Crystal Devices, Physics Today, Page 68, 1982), when the inner surfaces 346 and 347 of the plates 340 and 345 are coated with a surface treatment for aligning the liquid crystal such as polyamide, buffed, and oriented with their buffed directions perpendicular, the director of the liquid crystal material, absent any applied electrical voltage, will tend to align with the buffed direction (known as the "rub direction") in the regions of the layer 310 proximate each of the plates 340 and 345. Furthermore, the director will twist smoothly with respect to the normal axis through an angle of 90° along a path in the layer 310 from the first major surface adjacent to the plate 340 (i.e., at the 310/340 interface) to the second major surface adjacent to the plate 345 (i.e., at the 310/345 interface).

In the absence of an applied electric field, the direction of polarization of incoming polarized light will be rotated by 90° in traveling through the liquid crystal layer 310. When the glass plates and the liquid crystal layer are placed between crossed polarizers, such as the polarizer 300 and the analyzer 305, light polarized by the polarizer and traversing the display, as exemplified by the light ray 350, will thus be aligned with the polarization direction of the analyzer 320 and therefore will pass through the analyzer 305.

When a sufficient voltage is applied to the electrodes 325 and 330, however, the applied electric field causes the director of the liquid crystal material to tend to align parallel to the field. With the liquid crystal material in this state, light passed by the polarizer 300, as illustrated by the light ray 355, will be extinguished by the analyzer 305. Thus, an energized pair of electrodes will produce a dark region in the display, while light passing through regions of the display which are not subject to an applied field will produce illuminated regions. As is well known in the LCD display art, an appropriate pattern of electrodes, activated in selected combinations, can be utilized in this manner to display alphanumeric or graphic information. As explained further below, one or more compensator layers, such as the layers 360 and 365, may be included in the display to improve the quality of the display.

2.3 Normally White Twisted Nematic LCD Characteristics

FIG. 4 shows a calculated plot of liquid crystal director tilt as a function of position in a liquid crystal layer (where the cell gap has been normalized to unity) in a 90° twisted nematic cell. Typical distributions for molecular tilt angles when no voltage is applied (curve 400), under a typical select state voltage (curve 405), and under the application of several intermediate voltages chosen to yield linearly spaced gray levels (curves 410, 415, 420, 425, 430, and 435) are shown.

FIG. 5 is a related plot for the same cell depicting the calculated twist angle (the azimuthal angle $\Phi$ of the molecular long axes given an initial rub angle azimuth of 45°) of the liquid crystal molecules as a function of position in the cell. When there is no applied voltage, the twist is distributed evenly throughout the cell (straight line curve 500). Under a fully select state voltage, the twist angles are distributed as shown by the external, S-shaped curve 505. The twist distributions for gray levels are shown by the intermediate curves between the two curves 500 and 505.

As illustrated by FIGS. 4 and 5, when the fully selected voltage is applied, nearly all of the change in twist angle experienced by the liquid crystal molecules and little of the change in tilt angle occurs in the central region of the cell. Because of this phenomena, the continuous variation of molecular orientation within the cell can be separated into three regions, each of which is characterized by its own optical symmetry. Thus, the central regions 440 (FIG. 4) and 510 (FIG. 5) can be considered as nominally homeotropic in the fully selected state, approximating the properties of a C-plate. The regions 445 and 450 (FIG. 4) and 515; and 520 (FIG. 5), near each surface of the cell, behave as A-plates, each with its extraordinary axis aligned with the rub direction of the proximate substrate. Because there is essentially no twist in the molecules in the regions 445, 450, 515, and 520, the molecules are essentially aligned with the respective rub directions on either side of the liquid crystal layer. In addition, because the twist angle of the molecules in the regions 445; and 515 tends to be perpendicular to the twist angle of the molecules in the regions 450 and 520, the effect of these two regions on light traveling through the cell tends to be canceled, leaving the middle C-plate region to exert the dominant influence.

2.3(a) C-Plate Compensation

As is well known in the art, a negative C-plate compensator is designed to correct for the angle dependent phase shift introduced by propagation through the central, approximately C-plate region of a LCD cell. Such a compensator is effective to the extent that the optical symmetry of the central region dominates the selected state of the liquid crystal cell, that is, the extent to which the molecules align with the applied field. This implies that negative C-plate compensation will work best when strong fields are used for the energized state as this makes the homeotropic approximation more nearly correct. The use of a C-plate has been demonstrated to significantly reduce the leakage of the dark state over an extended field of view, thus improving contrast and reducing color desaturation.

2.3(b) Gray Scale Stability

While the C-plate compensator may be used to improve contrast it does not improve grayscale stability. The problem of maintaining constant grayscale luminance differences over the field of view relates substantially to the brightness level changes for levels assigned between the select (black for a normally white display) and nonselect (white for a normally white display) states. This phenomenon is generally depicted using transmission, or brightness versus voltage (BV) electrooptic response curves for a display to which eight gray levels are assigned, from level 0 (the select black state) to level 7 (the nonselect white state). Gray levels between 0 and 7 are chosen by assigning them a set of voltages spaced linearly in brightness along the BV curve between the select and nonselect voltages.

FIG. 6 is a plot of calculated BV curves for a normally white, 90° twisted nematic display as the horizontal viewing angle varies from 0° to 40° in 10° increments while the vertical viewing angle remains fixed at 0°. (The change in the BV curves with horizontal angle is first order independent of whether the horizontal deviation is to the left or right.) Note that the regions of each curve over which gray levels would be selected almost overlie one another for the various horizontal angles. This means that gray levels chosen to be linearly spaced at zero degrees would remain very nearly linear at even high horizontal viewing angles.

The gray scale linearity problem appears most predominantly when the vertical viewing angle varies. This is illustrated in FIG. 7, which shows a series of BV curves for a normally white, 90° twisted nematic display as the vertical viewing angle varies from −10° to +30° while the horizontal viewing angle remains fixed at 0°. It can be observed that for angles below 0° (measured from the normal) the BV curves shift to the right (higher voltage), and fall monotonically from their maximum but fail to reach zero.

For angles above normal, the curves shift to the left and develop a rebound after an initial minimum. These effects can be explained by considering the perspectives of viewers looking at the display from above, at, and below normal, as shown in FIG. 8. The critical feature to note is the relationship between the light traveling towards the viewer and the average liquid crystal director tilt at the center of a cell as voltage across the cell is increased.

For instance, as the voltage across a cell is increased, the average liquid crystal director in the center of the cell tilts from a parallel (with respect to the polarizer 300 and analyzer 305) orientation 815 toward a homeotropic one 825. For the viewer at normal incidence 800, retardation is highest at the nonselect state voltage and lowest at the select state voltage. When the anisotropy is zero, the polarization state of the light is unchanged and it is blocked by the analyzer. Thus, the viewer sees a monotonic decrease in brightness to zero with increasing voltage.

Now consider the case of a positive vertical viewing direction (viewer above normal incidence 805). At some intermediate voltage the average director 820 points toward the viewer and the retardation is minimal. Here the viewer sees a brightness with voltage that initially decreases toward a minimum, at the point of minimal retardation, and then increases.

For the negative vertical viewing direction (viewer below normal incidence 810), the average director always presents a large anisotropy to a light ray, even at the highest voltage. The viewer therefore sees a monotonic decrease in brightness. Furthermore, the average liquid crystal director is always oriented at a larger angle with respect to the light ray for the below normal viewer 810 than it is for the normal incidence viewer 800. Therefore, the anisotropy is greater and the brightness level is always higher in the negative vertical viewing direction than it is at normal incidence.

This dependency, of an LCD's brightness versus viewing angle, has a profound impact on gray scale linearity. (Note that a voltage chosen to yield a 50% gray level on the 0° curve in FIG. 7 yields a dark state on the +30° curve and approaches a fully white state at −10°.)

2.3(c) O-Plate Gray Scale Compensation

To eliminate reversal of gray levels and improve gray scale stability, a birefringent O-plate compensator can be used. The O-plate compensator principle, as described in pending U.S. patent application Ser. No. 223,251 filed on Apr. 4, 1994 utilizes a positive birefringent material with its principal optic axis oriented at a substantially oblique angle with respect to the plane of the display (hence the term "O-plate"). "Substantially oblique" implies an angle appreciably greater than 0° and less than 90°. O-plates have been utilized, for example, with angles relative to the plane of the display between 35° and 55°, typically at 45°. Moreover, O-plates with either uniaxial or biaxial materials can be used. O-plate compensators can be placed in a variety of locations between a LCD's polarizer layer and analyzer layer.

In general, O-plate compensators may also include A-plates and/or negative C-plates as well as O-plates. As is well known in the art, an A-plate is a birefringent layer with its extraordinary axis (i.e., its c-axis) oriented parallel to the surface of the layer. Its a-axis is thus oriented normal to the surface (parallel to the direction of normally incident light), leading to its designation as an A-plate. A-plates may be fabricated by the use of uniaxially stretched polymer films, such as polyvinyl alcohol, or other suitably oriented organic birefringent materials.

A C-plate is a uniaxial birefringent layer with its extraordinary axis oriented perpendicular to the surface of the layer (parallel to the direction of normally incident light). Negatively birefringent C-plates may be fabricated by the use of uniaxially compressed polymers (See, e.g., Clerc, U.S. Pat. No. 4,701,028), stretched polymer films, or by the use of physical vapor deposited inorganic thin films (See, e.g., Yeh, U.S. Pat. No. 5,196,953), for example.

Oblique deposition of a thin film by physical vapor deposition is known to produce a film having birefringent properties (see, e.g. Motohiro, Applied Optics, Volume 28, Pages 2466–2482, 1989). By further exploiting the tilted orientation of the optical symmetry axis, this process can be used to fabricate O-plates. Such components are by their nature biaxial. Their growth characteristics generate a microscopic columnar structure. The angles of the columns are tipped towards the direction of the arriving vapor stream. A deposition angle (measured from normal) of 76°, for example, results in a column angle of approximately 45°. The columns develop an elliptical cross-section as the result of shadowing. This elliptical cross-section gives rise to the biaxial character of the films. The birefringence, in magnitude and symmetry, is entirely attributable to the film microstructure and is referred to as form birefringence. These phenomena in thin films have been extensively studied and described by Macleod (Structure-related Optical Properties of Thin Films, J. Vac. Sci. Technol. A, Volume 4, No. 3, Pages 418–422, 1986).

Uniaxial O-plate components can also be used to improve grayscale stability in normally white twisted nematic LCDs. These may be fabricated by the use of suitably oriented organic birefringent materials. Those skilled in the art will recognize other means for fabricating both uniaxial and biaxial O-plates.

FIGS. 9 and 10 show the effect that an O-plate compensator can have on normally white twisted nematic display. FIG. 9 shows the BV curves for a normally white twisted nematic display using an O-plate compensator at a fixed vertical viewing angle of 0° and various horizontal viewing angles. FIG. 10 shows the BV curves for a normally white twisted nematic display using an O-plate compensator at a fixed horizontal viewing angle of 0° and various vertical viewing angles. In this example, the O-plate layer is positioned adjacent to the liquid crystal layer on the source side of the display. A-plate layers are disposed on both sides of the O-plate/liquid crystal layer stack. The variation of the BV curves versus both horizontal and vertical viewing angles is greatly reduced relative to the uncompensated case shown in FIGS. 6 and 7.

Elimination of gray scale reversal by the use of an O-plate compensator layer occurs in the following manner. In the positive vertical viewing direction, the retardation of the O-plate increases with viewing angle and tends to offset the decreasing retardation of the liquid crystal layer. When the viewer is looking down the axis of the average liquid crystal director, the presence of the O-plate prevents the layers between the two polarizers from appearing isotropic. Thus, the rebound in the BV curve, shown in FIG. 7, is reduced and moved to higher voltages outside of the gray scale voltage range as shown in FIG. 10.

In the negative vertical viewing direction, the combination of an O-plate and an A-plate with their optic axes nominally at right angles tends to exhibit birefringence characteristics similar to that of a negative birefringence retarder with its optic axis oriented perpendicular to the plane containing the axes of the 0-plate and A-plate. The direction of this retarder axis is nominally parallel to the orientation of the average liquid crystal in the central region of the cell when it is driven at a voltage between select and nonselect states. Thus, the presence of an O-plate oriented in this manner tends to cancel the birefringence of the liquid crystal layer, pulling the BV curve down, or equivalently, moving it toward the direction of lower voltages (i.e., left) as shown in FIG. 10. A similar effect occurs in the positive and negative horizontal viewing directions as shown in FIG. 9 when compared to FIG. 6.

The overall effect of introducing an O-plate compensator in this manner is to eliminate large rebounds in the gray scale voltage region and reduce the left-to-right shift in the BV curves as the viewing angle is varied from negative to positive vertical angles.

The orientations of the compensator optic axes can be carefully chosen so that the combined retardation effects cancel each other in the normal incidence viewing direction as well as minimize rebounds in the horizontal viewing direction. Combinations of more than one O-plate can be used as long as their orientations satisfy these requirements. Furthermore, negative C-plates can, for certain configurations, increase the contrast ratio at large fields of view, occasionally with some decrease in gray scale linearity.

2.3(d) O-Plate Technology

The liquid crystal layer, the compensator layer(s), the polarizer layer, and the analyzer layer can assume a variety of orientations relative to one another in a liquid crystal display. Some of the possible configurations which have been considered, and set out in pending U.S. patent application No. 223,251 are repeated in Table 1; where 'A' represents an A-plate, 'C' represents a C-plate, 'O' represents an O-plate, 'LC' represents the liquid crystal, and 'OxO' represents crossed O-plates. Crossed O-plates are adjacent O-plates with their azimuthal angles Φ 235 nominally crossed, one oriented between 0° and 90°; and the second oriented between 90° and 180°.

TABLE 1

Liquid Crystal Display Elements

| ←Toward Rear (Polarizer Side) | | | | | Toward Front (Analyzer Side)→ | | |
|---|---|---|---|---|---|---|---|
|   |   | O | A | LC |   |   |   |
|   | A | O |   | LC |   |   |   |
|   |   |   | O | LC | O | A |   |
|   | A | O | A | LC |   |   |   |
|   |   | O | A | LC | A |   |   |
|   | O | A | C | LC |   |   |   |
|   |   | OxO | A | LC |   |   |   |
|   | A | OxO | A | LC |   |   |   |
|   |   |   | A | LC | OxO | A |   |
| A | O | A | C | LC |   |   |   |
|   | A | O |   | LC | O | A |   |
|   | A | O | C | LC | C | O |   |
|   | A | O | C | LC | C | O | A |
|   | C | A | O | LC | O | A | C |

The projections of the principal axes onto the plane of the display with respect to the liquid crystal director can vary with the embodiment. In some cases, for example with two O-plates, the O-plate axis projections are at 45° with respect to the average liquid crystal director, while in others, the O-plate axis is parallel with the liquid crystal director.

Crossed O-plate (OxO) designs that are further compensated with A-plates provide additional design flexibility. The choice of A-plate value is not critical as such designs can be adjusted by varying the relative orientations of the A-plates. Thus, it is possible to generate desired solutions with commercially available A-plate retardation values.

2.4 Twisted and Splayed O-plates

Computer modeling and display cell measurements show the optical behavior of the biaxial O-plate based compensators produced from $Ta_2O_5$ to be qualitatively different from that of compensators produced from uniaxial polymerized liquid crystal materials. For some applications, grayscale stability and contrast over field of view properties produced by the biaxial components are preferred. However, organic compensator films based on uniaxial liquid crystal polymers are very attractive because they both make a wider range of material parameters accessible and also allow the possibility of inexpensive mass production of compensator components. Therefore a goal of further compensator development has been to produce a thin film organic O-plate layer which shows biaxial character.

It is believed that biaxial compensator components produce qualitatively different optical performance because the deformation structure of the partially selected liquid crystal layer in a twisted nematic display has some biaxial character itself. In the nonselect state the liquid crystal has a helical structure which rotates the polarization state of incident light by means of the process of adiabatic waveguiding as described above. As the electric field across the liquid crystal layer is increased the helical structure is distorted and the efficiency of the waveguide decreases. Some portion of the light is no longer efficiently rotated and begins as a result to lag the rotation of the liquid crystal helical structure. This light encounters a medium intermediate in refractive index between the ordinary and extraordinary index values. The net result is that the medium appears biaxial.

The O-plate solution to the compensation of the twisted nematic display was based on the approximate model described above that the liquid crystal layer in the select state of the twisted nematic display could be divided into three regions, two A-plate-like regions and a central region of pseudo-homeotropic character. O-plate compensated displays, however, operate with the full-on black state accessible at voltages considerably reduced from the black state voltage in uncompensated displays. At these reduced drive voltages, the liquid crystal layer central region is unlikely to have completely deformed to the pseudo-homeotropic state, and the three region model becomes even more approximate. At these intermediate voltages the liquid crystal layer central region will still be significantly splayed and twisted yielding the biaxial character described in the above paragraph.

The intuitive approach to compensator development has been that like compensates like, i.e., compensators should have similar or complementary optical symmetries to the liquid crystal layers they are intended to compensate. Based on this idea and the analysis in the above paragraphs it was decided to investigate splayed and twisted O-plate structures with the idea that they could be substituted into the existing O-plate configurations described above with resulting improved performance.

2.5 Summary

When viewed at an angles nearly normal to their surfaces twisted nematic liquid crystal displays provide high quality optical characteristics, but at large viewing angles the image tends to degrade and exhibit poor contrast and grayscale stability. Compensator configurations containing O-plates have been shown to produce greatly improved contrast and grayscale stability over field of view. O-plate configurations with biaxial optical symmetry have given qualitatively different performance than those with uniaxial symmetry. It is believed that this is true because biaxial O-plates more closely approximate the symmetry of an energized twisted nematic liquid crystal layer. Currently available biaxial O-plates are produced using an expensive vacuum deposition process, and a more cost effective large volume process is desired.

It is the goal of this invention to provide a process for producing O-plates which have the desired biaxial symmetry using an inexpensive fabrication process which is capable of being scaled up to large volume production.

3. SUMMARY OF THE INVENTION

The compensator design of this invention, which includes a positively birefringent twisted and/or splayed O-plate layer, makes possible a significant improvement in the gray scale properties and contrast ratios of liquid crystal displays (LCDs) over a wide range of viewing angles. By making use of polymerized thin films of organic liquid crystal materials the compensators are able to duplicate the performance of existing biaxial inorganic O-plate compensators, but at reduced cost and with more design flexibility.

An O-plate compensator comprising an organic liquid crystal polymer thin film, and methods for fabricating the same, are disclosed. On the microscopic scale the film is composed of a polymerized birefringent liquid crystal material which is uniaxial or near uniaxial in character. The liquid crystal material is constrained such that its optical symmetry axis is, on average, oriented obliquely with the surface of the film. Within this constraint, the direction of the material's optical symmetry axis is allowed to vary continuously along the axis normal to the film surface. If the variation is in the tilt angle of the optical symmetry axis relative to the film surface the liquid crystal material will have splayed structure. If the variation is in the azimuthal angle of the optical symmetry axis the material will have twisted structure. The invention can comprise either angular variation or both in combination.

The oblique orientation of the liquid crystal director, which is parallel to the optical symmetry axis, is achieved by casting an organic thin film onto a surface specially prepared for orienting liquid crystal monomers, such as oblique SiO, mechanically rubbed polymers, etc. The variation in tilt angle through the layer is achieved by selecting a liquid crystalline material such that its tilt angle at the substrate surface is substantially different from that at the liquid crystal air interface. The variation in azimuthal angle through the layer is achieved by doping the liquid crystal monomer with a chiral additive in sufficient quantity so as to provide the proper helical pitch along the axis normal to the film surface. The film can either be cast from a solution of the liquid crystal polymer or from a reactive liquid crystal monomer. Any solvent that may be used during the fabrication process is evaporated off and the organic thin film is annealed at a temperature in its nematic phase. If a reactive monomer is used, the film is then photopolymerized. Finally, the film is thermally quenched to 'freeze' in the liquid crystalline structure. Alternative embodiments of the splayed/twisted O-plate include the use of nematic or smectic C materials. Fabrication techniques employing these materials are described.

4. BRIEF DESCRIPTION OF DRAWINGS

5. DETAILED DESCRIPTION OF A SPECIFIC EMBODIMENTS

Illustrative embodiments of the invention are described below as they might be implemented using polymeric liquid crystalline thin films to create a twisted and/or splayed O-plate compensator. In the interest of clarity, not all features of an actual implementation are described in this specification. It will of course be appreciated that in the development of any such actual implementation (as in any development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

5.1 Introduction

Figure 1A:
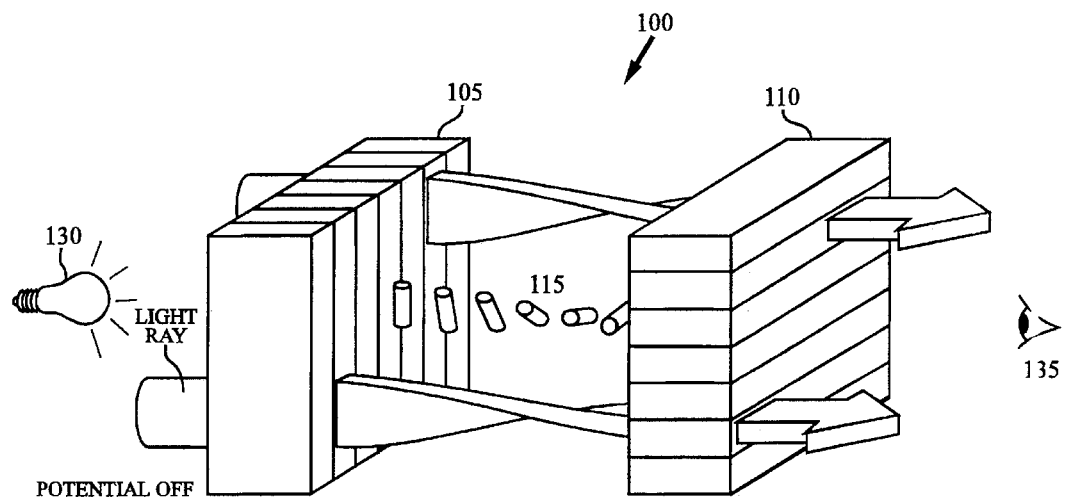
FIGS. 1a and 1b show, in overview, the operation of a normally white, 90° twisted nematic liquid crystal display.
Figure 1B:
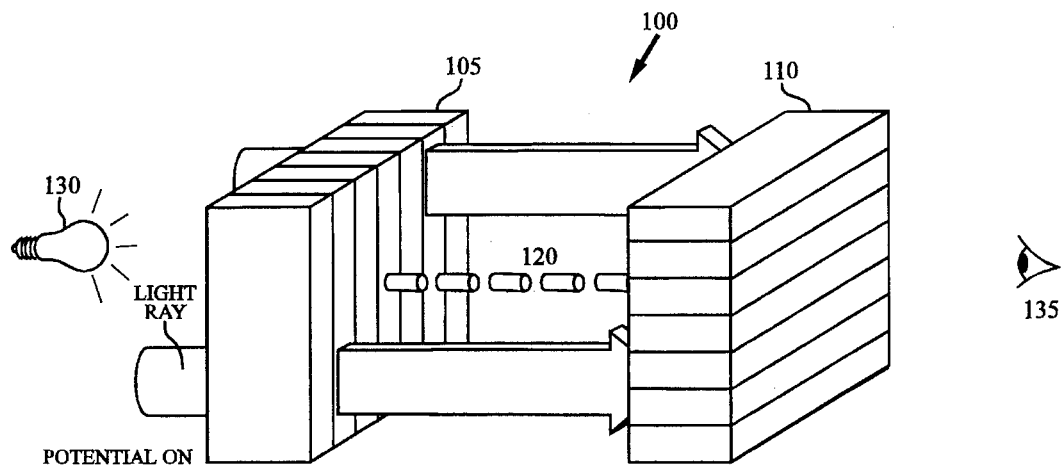
Figure 2:
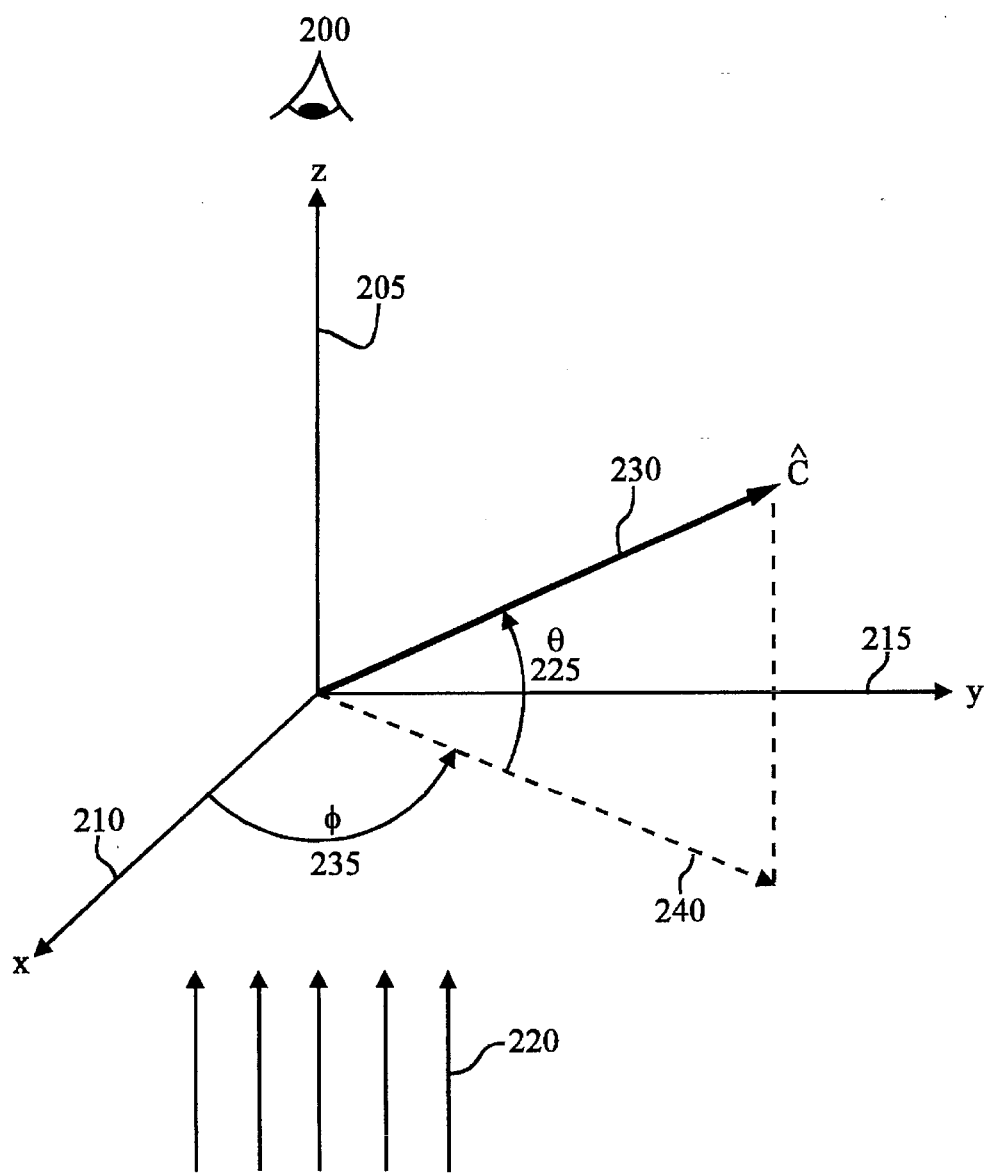
FIG. 2 depicts a coordinate system that is used to specify component orientations in the description of this invention.
Figure 3:
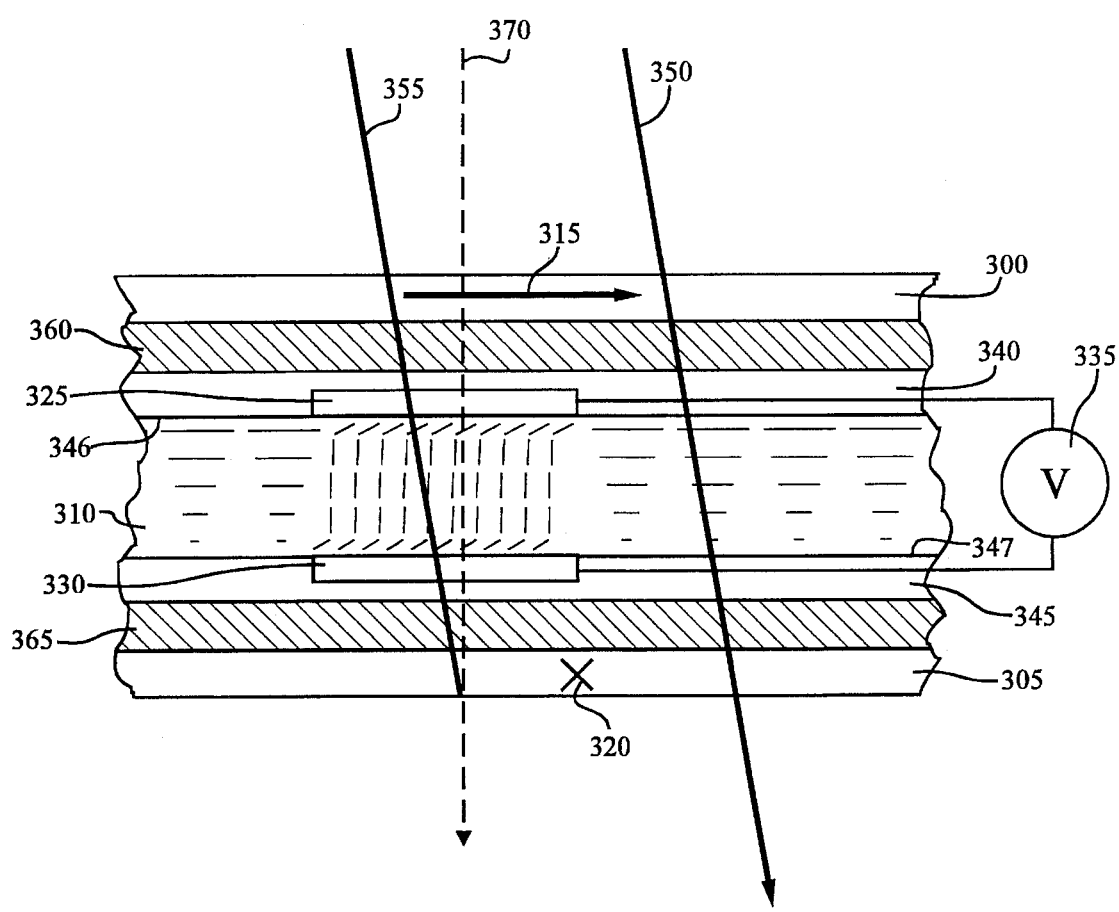
FIG. 3 is a cross-sectional schematic view of a 90° twisted nematic, transmissive type normally white liquid crystal display.
Figure 4:
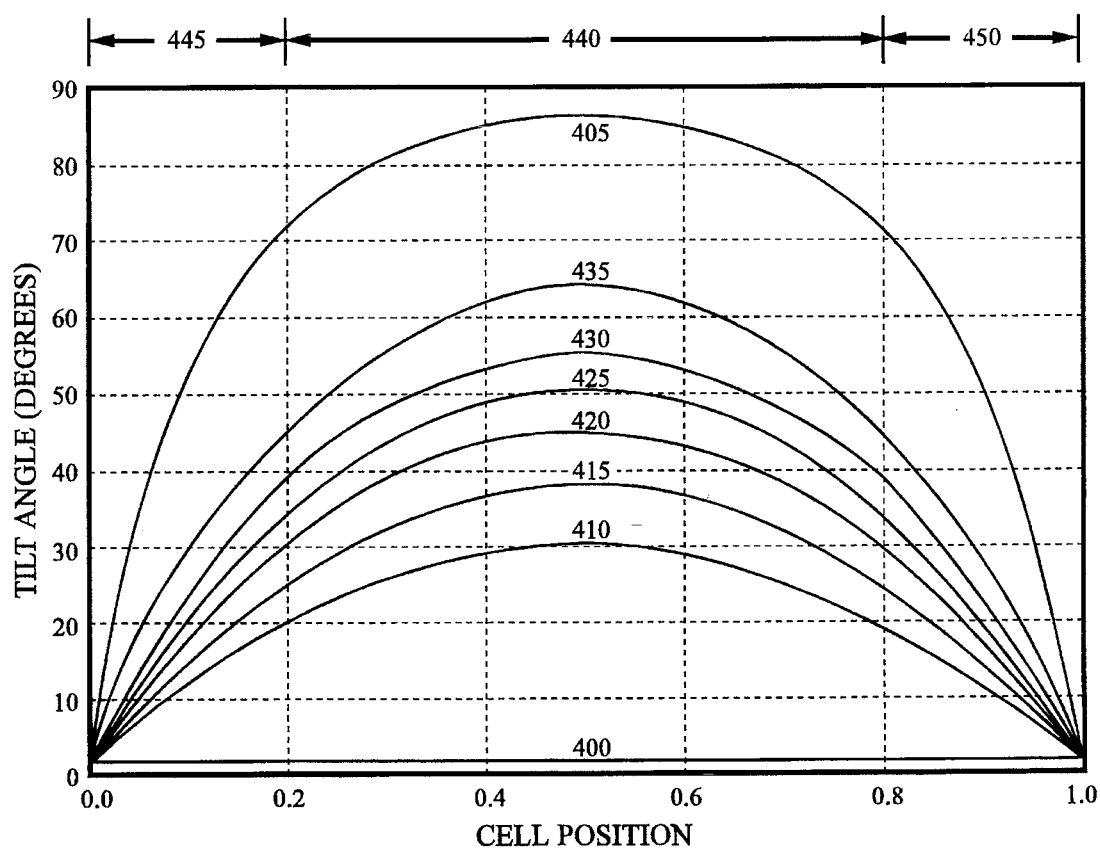
FIG. 4 is a plot of the tilt angle of the director (in degrees along the vertical axis) as a function of position (as a fraction of the depth along the horizontal axis) in a 90° twisted nematic liquid crystal cell.
Figure 5:
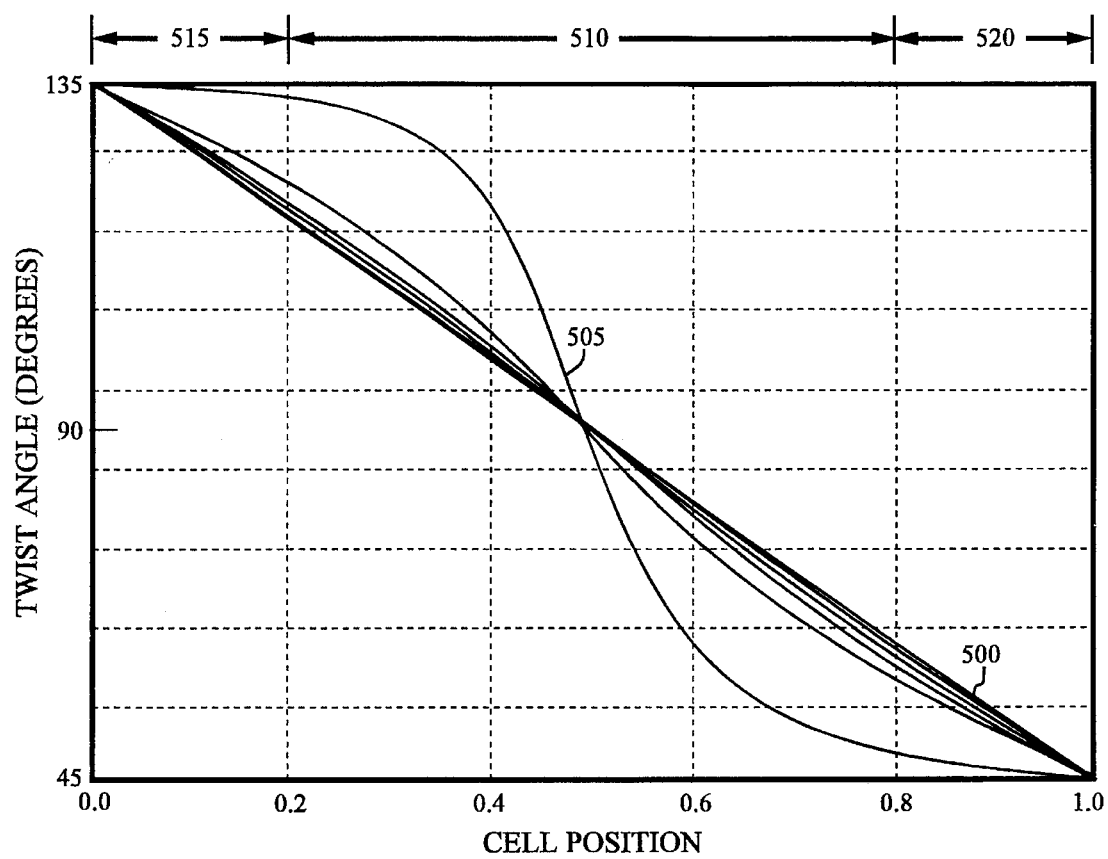
FIG. 5 is a related plot for the cell shown in FIG. 4, depicting the twist angle of the liquid crystal molecules as a function of their position in the cell.
Figure 6:
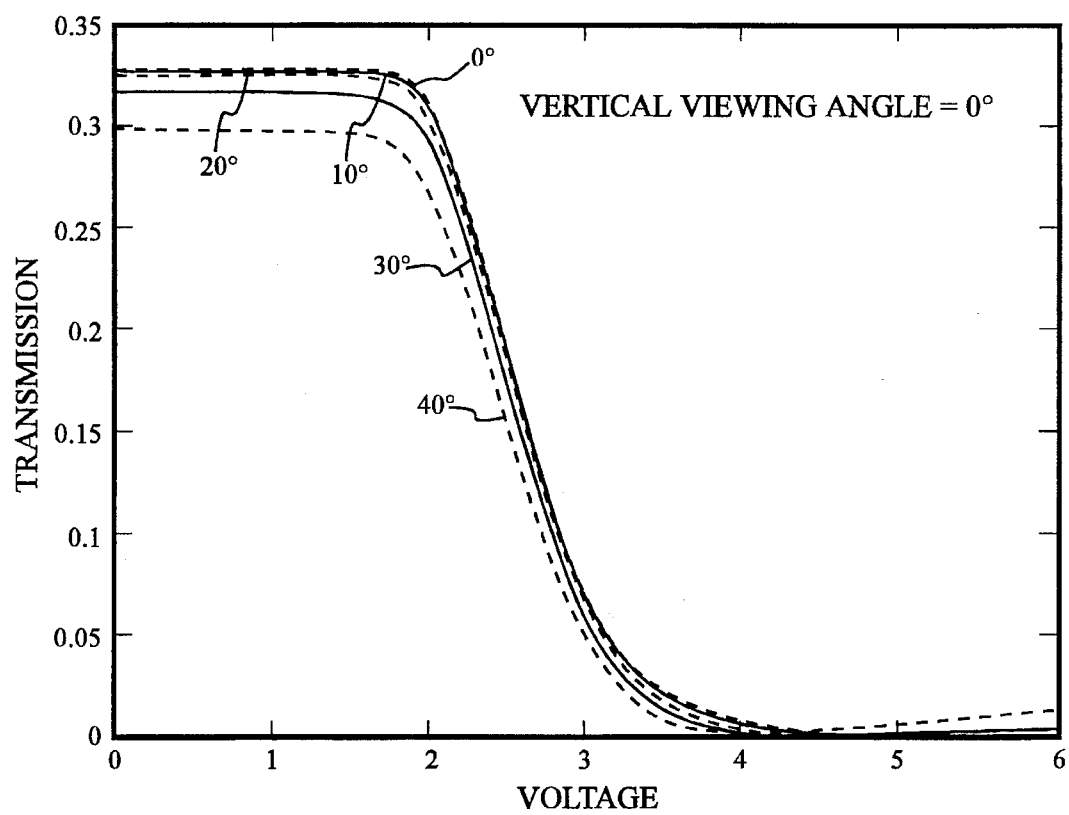
FIG. 6 is a plot of calculated brightness vs. voltage electrooptic curves at a variety of horizontal viewing directions for a typical twisted nematic display without the benefit of O-plate gray scale compensation.
Figure 7:
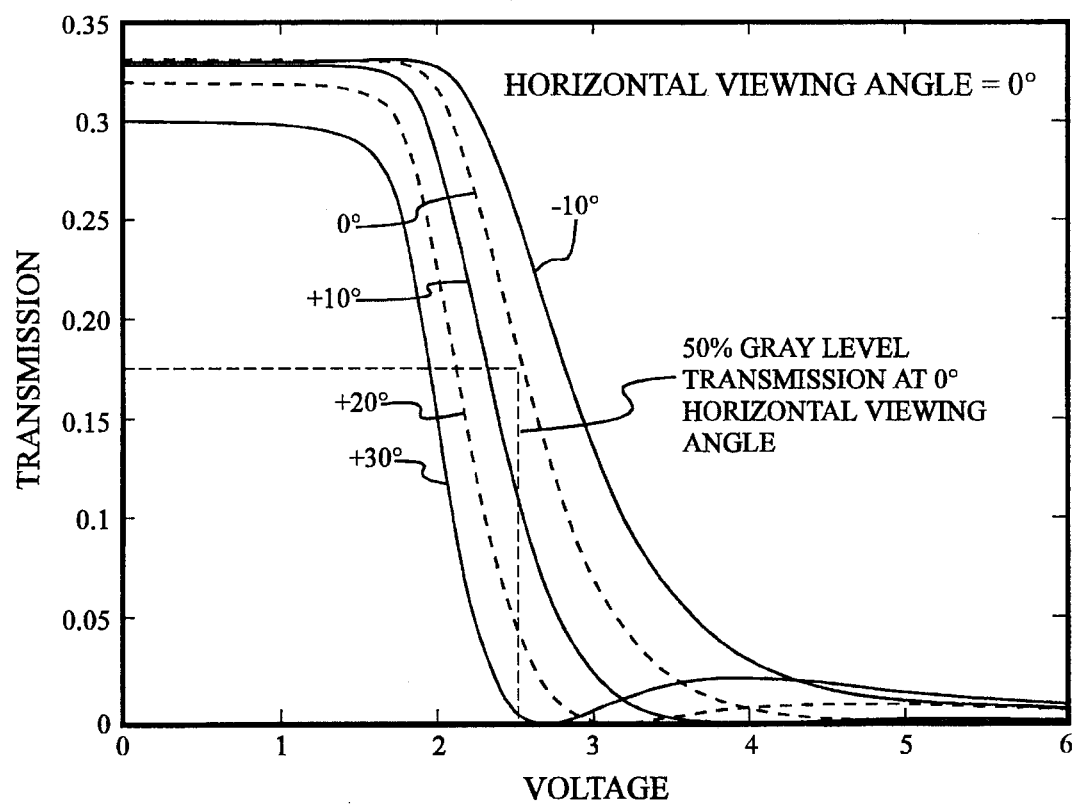
FIG. 7 is a plot of calculated brightness vs. voltage electrooptic curves at a variety of vertical viewing directions for a typical twisted nematic display without the benefit of O-plate gray scale compensation.
Figure 8:
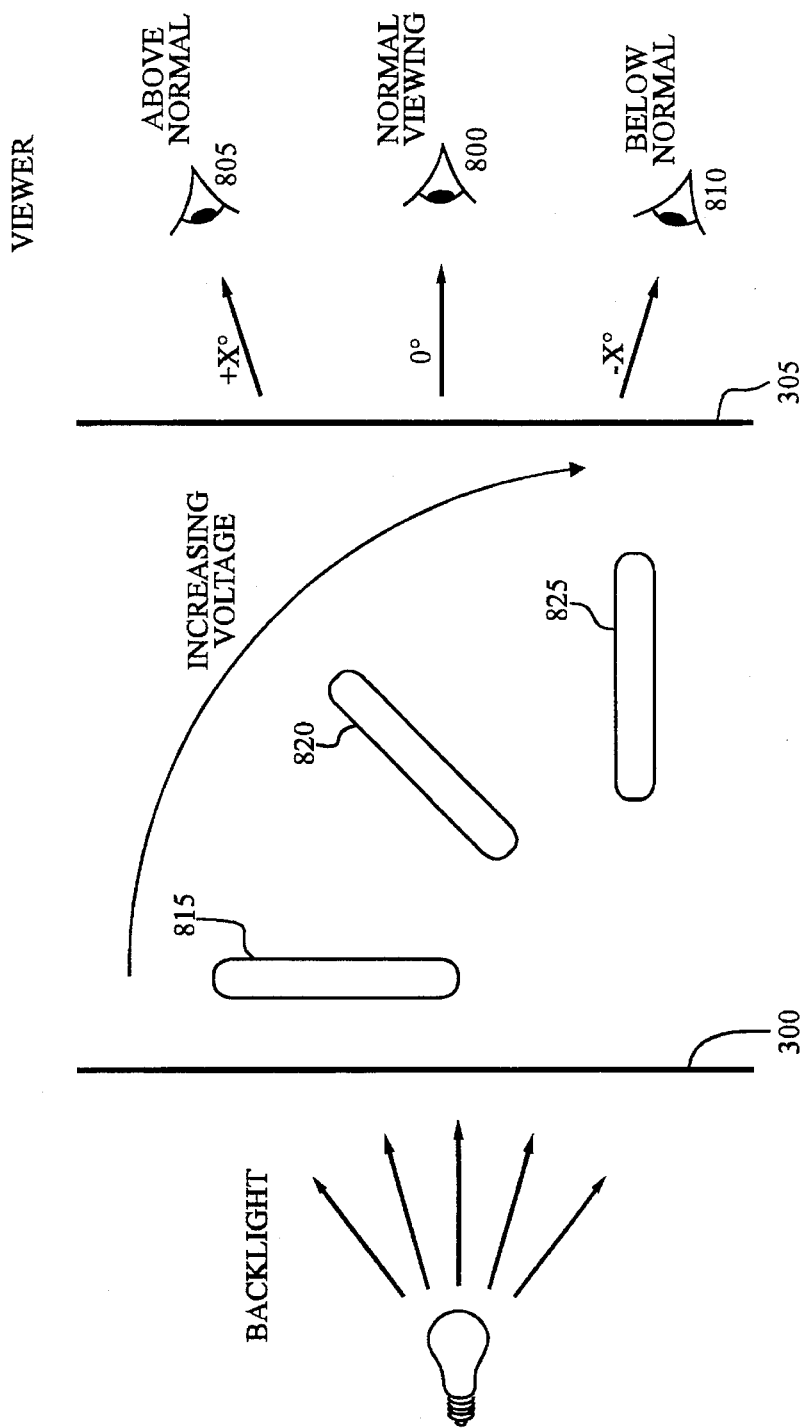
FIG. 8 is an illustration of the viewer's perspective relative to the average director orientation of a liquid crystal display.
Figure 9:
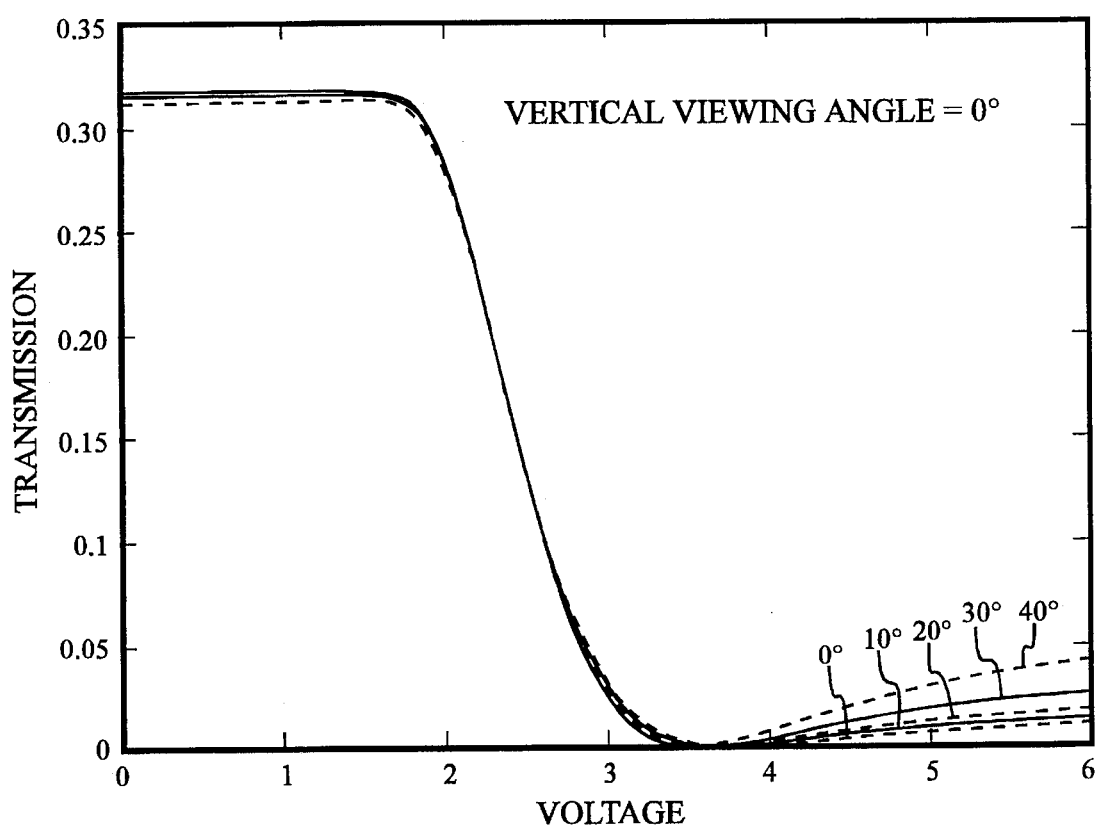
FIG. 9 is a plot of calculated brightness versus voltage electrooptic curves at a variety of horizontal viewing directions for a typical twisted nematic display with the benefit of O-plate gray scale compensation.
Figure 10:
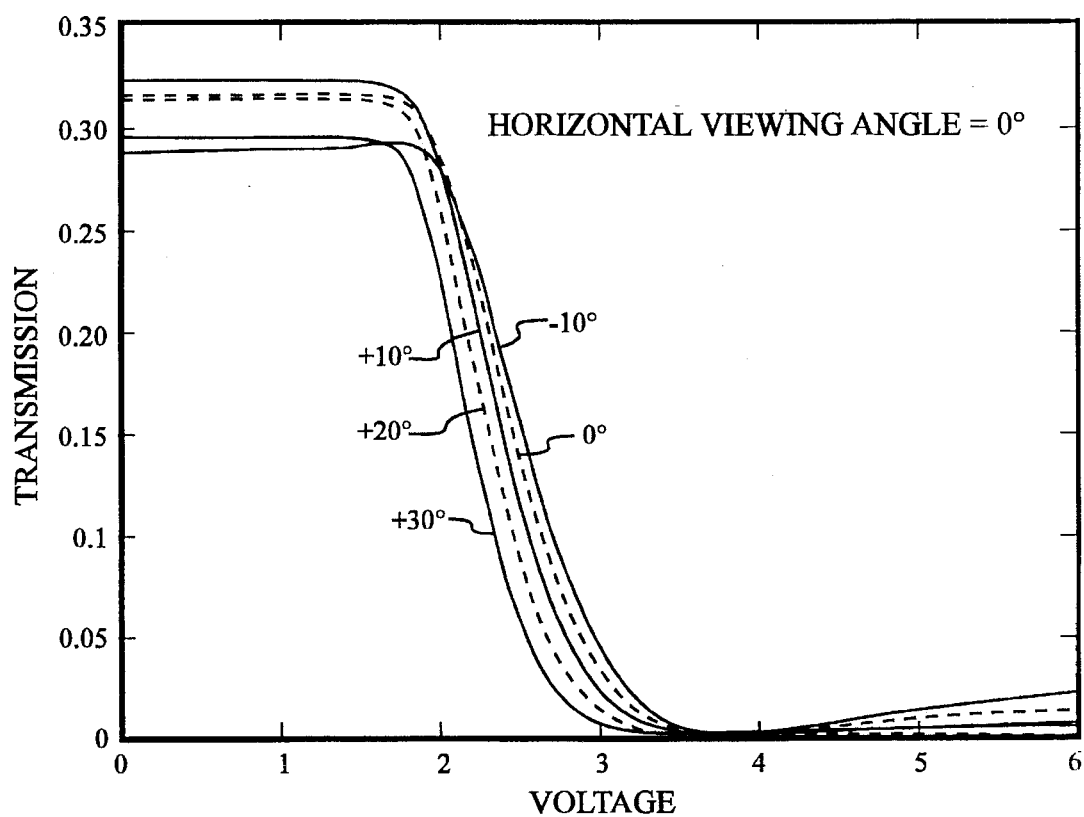
FIG. 10 is a plot of calculated brightness versus voltage electrooptic curves at a variety of vertical viewing directions for a typical twisted nematic display with the benefit of O-plate gray scale compensation.
Figure 11:
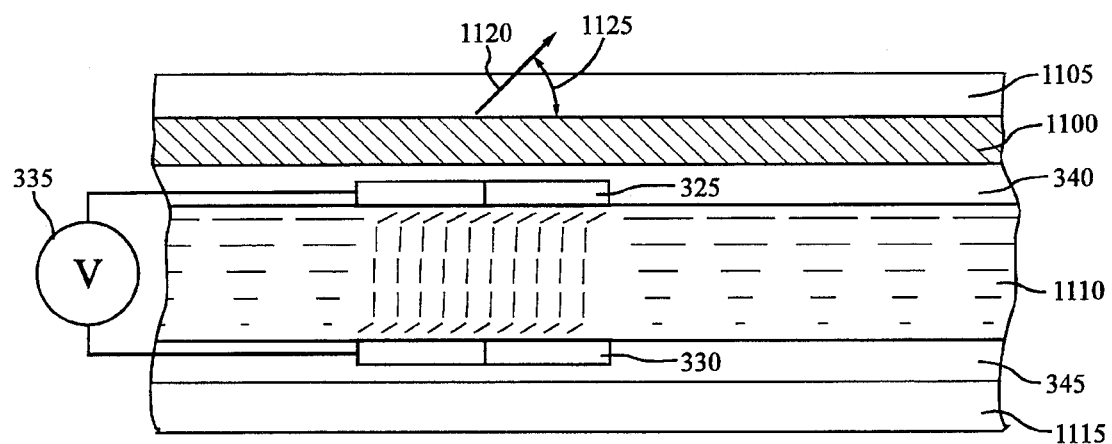
FIG. 11 is a cross-sectional view of a normally white, twisted nematic liquid crystal display in accordance with the invention.

FIG. 11 shows an illustrative embodiment of a liquid crystal display (LCD) system in accordance with the invention, that uses a single twisted and/or splayed O-plate compensator 1100 disposed between a polarizer 1105 and a liquid crystal layer 1110. The O-plate layer 1100 comprises birefringent liquid crystal polymer layer having an optical symmetry axis 1120 oriented, on average, at a tilt angle 1125, relative to the surface of the liquid crystal polymer layer 1110, of approximately 20° to 80°. Alternatively, the O-plate layer could be located between liquid crystal layer 1110 and an analyzer 1115, or in both locations. More details on the structure of the twisted and/or splayed O-plate layer are given below.

The decision as to where to place the O-plate compensator is purely a design choice and is, generally, based on the optical requirements of the display being compensated and on the manufacturing and cost constraints of the display system.

In general, O-plate compensators may also include A-plates and/or negative C-plates as well as O-plates. Twisted/splayed O-plate compensators may contain both twisted/splayed O-plates and simple O-plates. As is well known in the art, an A-plate is a birefringent layer with its extraordinary axis (i.e., its c-axis) oriented parallel to the surface of the layer. Its a-axis is thus oriented normal to the surface (parallel to the direction of normally incident light), leading to its designation as an A-plate. A-plates may be fabricated by the use of uniaxially stretched polymer films, such as polyvinyl alcohol, or other suitably oriented organic birefringent materials.

5.2 Nematic Embodiment

Figure 12:
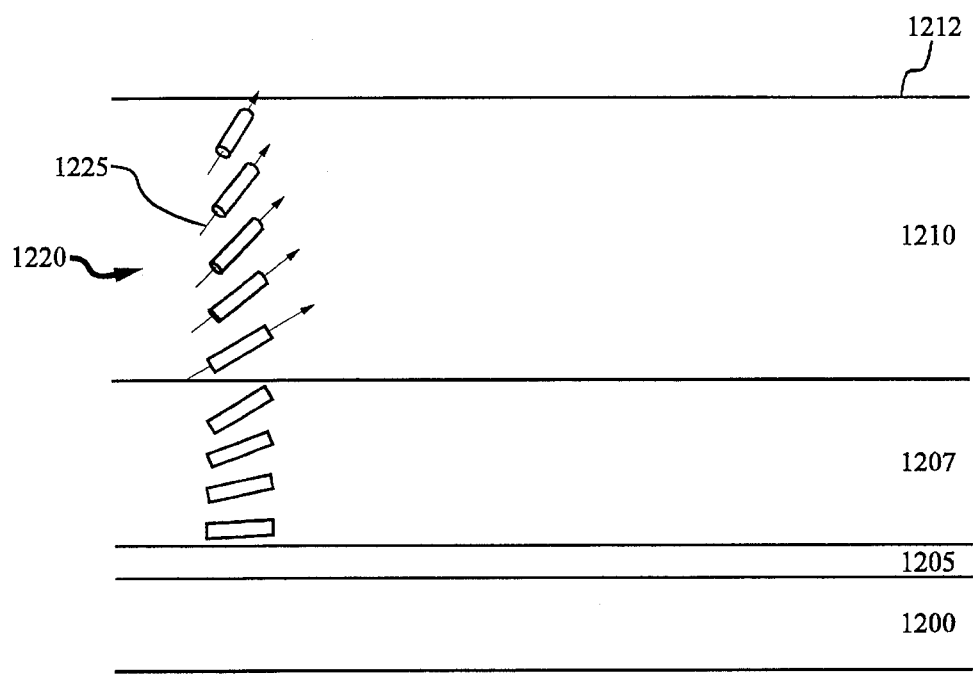
FIG. 12 is a cross-sectional schematic view of one embodiment of a twisted/splayed O-plate compensator stack produced by polymerization of nematic liquid crystal monomers.

Another illustrative embodiment, shown in FIG. 12, includes a rigid glass substrate 1200, an alignment layer 1205, a polymerized pretilt nematic liquid crystal layer 1207, an alignment/pretilt layer interface 1205/1207, a polymerized nematic liquid crystal monomer layer 1210, a pretilt/liquid crystal layer interface 1207/1210 and a nematic/air interface 1212. The nematic material in the layer 1210 has been doped with a chiral dopant to yield a cholesteric pitch approximately 12 times the layer thickness, yielding a twist angle of approximately 30 degrees in the layer 1210. The liquid crystal layers are deposited in the form of polymerizable nematic monomer compounds doped with approximately 0.5% of Igracure-651, a photoinitiator.

The alignment layer 1205 is produced by coating a surface of the substrate 1200 with a polyamide material that produces a liquid crystal pretilt angle of from 1° to 10° in the layer 1207 at the alignment/pretilt layer interface 1205/1207. The alignment material is then rubbed so as to produce uniformly tilted alignment in the desired azimuthal orientation in the layer 1207.

A thin film of liquid crystal monomer is applied to the alignment layer 1205 using the technique of spin coating from a solution in an inert solvent. Other methods of coating the nematic material such as, for example, dip or slot-die coating can be used as well. The solution coated onto the surface of the alignment layer 1205 may contain prepolymerized liquid crystal side-chain polymers added as a viscosity modifier to improve coating wetting characteristics. In addition, the solution should contain a photoinitiator as stated above.

After the nematic film has been applied to the alignment layer 1205, the solvent is driven off at elevated temperature producing the pretilt layer 1207. The temperature of the pretilt layer 1207 is adjusted so as to produce the desired nematic phase in the layer 1207 and the desired tilt angle at the 1207/1210 interface. The liquid crystal film is then illuminated with ultraviolet light (actinic radiation) at a wavelength of approximately 360 nanometers with a total exposure sufficient to polymerize the monomer to liquid crystal polymer film, thereby preserving the order of the liquid crystal phase of the layer 1207 and the desired tilt angle at the 1207/1210 interface.

The purpose of the liquid crystal pretilt layer 1207 is to provide a high pretilt alignment layer for the liquid crystal monomer used to produce the actual compensator layer 1210. If the pretilt layer 1207 is thick enough, the pretilt angle of the material at the surface of the layer 1210 will be dictated by the nematic/air tilt angle of the material at the surface of the layer 1207. After the application of the liquid crystal layer 1210, the nematic/air interface of the layer 1207 becomes the pretilt/liquid crystal interface 1207/1210. The nematic material in the layer 1207 undergoes an incremental tilting, referred to as a continuous splay/bend deformation, from the low tilt angle at the 1205/1207 interface up to the desired tilt angle at the 1207/1210 interface. For the layer 1207, the difference between the tilt angle at the 1205/1207 interface and the tilt angle at the 1207/1210 interface is referred to as the splay angle. The pretilt layer 1207 should be sufficiently thin, approximately 100 nm., when compared to the thickness of layer the 1210, approximately 1 μm., such that its optical retardation will be insignificant as compared to the overall retardation of the compensator stack.

Other possible alignment layer materials could be substituted for the layers 1205 and 1207 to give the required 30° pretilt angle and azimuthal alignment for the liquid crystal layer 1210. Such materials could include, for example, mixtures of homogenous and homeotropic alignment materials that are then rubbed.

After the layer 1207 has been prepared, another layer of nematic monomer solution is deposited on its surface in a manner entirely analogous to the original deposition of the layer 1207. After the solvent has been driven off and the material polymerized with UV irradiation, this material constitutes layer 1210. Other methods for polymerizing thin monomer films well known in the an could be used.

The material used to prepare the layer 1210 is similar to that in 1207 with a few exceptions. The material in the layer 1210 has been doped with a chiral material as described above so as to produce an approximately 30° twist of the azimuthal orientation of the nematic optical symmetry axis (extraordinary axis). This variation in azimuthal orientation occurs about an axis normal to the layer 1210 from top to bottom through the layer 1210. The twisted and splayed structure of the layer 1210 is represented by the liquid crystal side chains or moieties 1220. The variation in the orientation of the optical symmetry axis of the layer 1210 is represented by the arrows 1225 projected from the moieties 1220. As can be seen from FIG. 12, the optical symmetry axis varies through the layer 1210 according to the tilted and azimuthal orientation of the moieties 1220 of the layer 1210.

In this particular embodiment, the material used to produce the layer 1210 has been chosen to have a tilt angle of 60° at the nematic/air interface 1212 (the 30° pretilt angle at the 1207/1210 interface plus a 30° splay angle through the layer 1210). The solution concentration of the nematic monomer, concentration of prepolymerized nematic polymer, and the deposition parameters are selected such that the layer 1210 is of the proper thickness to provide the required retardation value, on the order of 1 μm. A splayed/twisted O-plate layer prepared in this way will have a varying optical symmetry axis with a splay angle of 30°, a twist angle of 30°, and an average tilt angle of 45°.

5.3 Smectic C Embodiment

Figure 13:
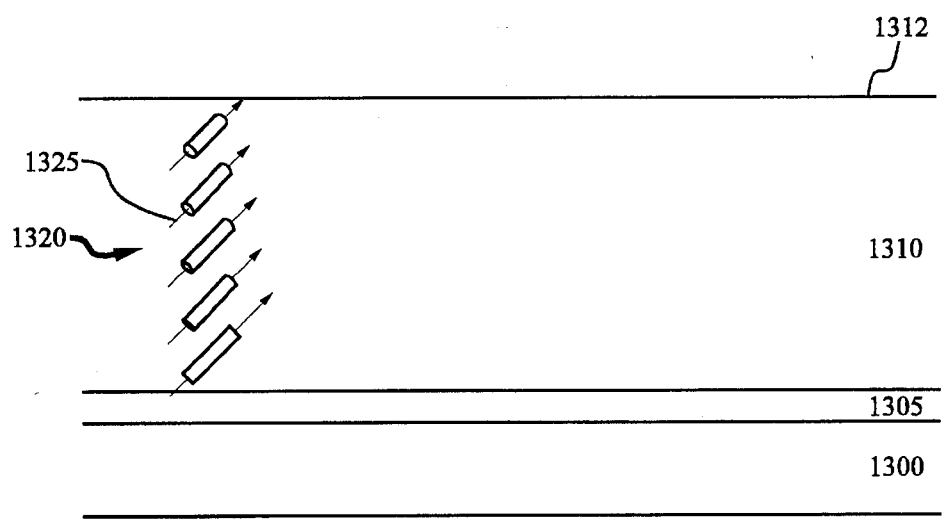
FIG. 13 is a cross-sectional schematic view of one embodiment of a twisted O-plate compensator stack produced by polymerization of smectic C liquid crystal monomers.

An alternative embodiment is shown in FIG. 13. As before, the compensator system comprises a rigid glass substrate 1300, an alignment layer 1305, a polymerized liquid crystal layer 1310, a liquid crystal/alignment layer interface 1305/1310, and a liquid crystal/air interface 1315. In this embodiment, however, the polymerized liquid crystal layer 1310 has a smectic C phase and a smectic C intralayer tilt angle of 45°. As such, the desired intralayer tilt angle (45°) of the liquid crystal layer 1310 remains constant through the layer 1310.

A liquid crystal material with a smectic C to nematic phase transition rather than a smectic C to smectic A phase transition is preferred because such materials tend to have large, in the range of 10° to 45°, smectic C intralayer tilt angles.

As in the nematic embodiment, an alignment layer 1305 is produced on the surface of the substrate 1300. In one embodiment, the alignment layer 1305 material is a thin film of silicon monoxide, $SiO_x$, obliquely deposited at a polar angle of approximately 60° and overcoated with a thin film of egg lecithin, a homeotropic alignment material. This alignment layer 1305 produces a liquid crystal pretilt angle for nematic materials of approximately 80° and a uniform azimuthal direction of the liquid crystal director which is determined by the azimuthal $SiO_x$ deposition angle.

Next, a thin film of polymerizable liquid crystal monomer is laid down on the alignment layer 1305 using techniques detailed in the nematic embodiment. The liquid crystal monomer is doped with a chiral material such that in its smectic C phase it will have a chiral pitch approximately 12 times the thickness of the layer 1310, yielding a twist angle of approximately 30 degrees through the layer 1310. After the solvent has been removed, the temperature of the monomer film is raised high enough to transform it into the nematic phase. The nematic phase then adopts a uniform pre-tilt angle of 80° at the liquid crystal/alignment layer interface 1305/1310. The temperature is then slowly decreased, e.g., at a rate of approximately 0.1° C. per second, transforming the liquid crystal film into its smectic C phase.

This process forms smectic C layers parallel to the surface of the alignment layer 1305 with the molecules initially adopting a smectic C intralayer tilt angle of approximately 0°. As the temperature of the film is lowered further through its smectic C temperature range, the smectic C intralayer tilt angle increases. (The azimuthal direction of the molecules is determined by the azimuthal $SiO_x$ deposition angle.) At a temperature just above the material's melting point, the smectic intralayer tilt angle reaches a maximum value of approximately 45°. Furthermore, in a smectic C material, the polar tilt angle at the liquid crystal/air interface 1312 does not influence the tilt angle of the bulk liquid crystal material in the layer 1310. Various other ways to form smectic layers parallel to the alignment layer will be recognized by those skilled in the art.

As stated above, the liquid crystal monomer is doped with a chiral material to produce an approximately 30° twist of the azimuthal orientation of the liquid crystal optical symmetry axis (extraordinary axis). This variation in azimuthal orientation occurs about an axis normal to the layer 1310 from top to bottom through the layer 1310. The azimuthal orientation of moieties 1320 at the liquid crystal/air interface 1312 is determined by a combination of the azimuthal orientation of the liquid crystal at the liquid crystal/alignment layer interface 1305/1310, the pitch of the chiral helix in the smectic C material, and the smectic C film layer thickness. The tilted helical structure of the smectic material in the layer 1310 is represented by the moieties 1320. The variation in the orientation of the optical symmetry axis of the layer 1310 is represented by the arrows 1325 projected from the moieties 1320. As can be seen from FIG. 13, the optical symmetry axis varies through the layer 1310 according to the tilted and azimuthal orientation of the moieties 1320 of the layer 1310.

Upon obtaining the desired intralayer tilt angle in the liquid crystal film and the desired azimuthal orientation, the liquid crystal monomer film is irradiated with ultraviolet light that is sufficient to polymerize the monomer to a polymeric film 1310 in which the order of the smectic liquid crystal is preserved, typically 4–10 $J/cm^2$. Other polymerization techniques for thin films are well known in the an and may also be used. The result of this process is a thin film or liquid crystal layer 1310 of liquid crystal polymer that is positively birefringent and has an optical symmetry axis that is oriented at a polar tilt angle of approximately 45 ° with a twist angle of approximately 30°.

5.4 Multilayer Embodiment

Figure 14:
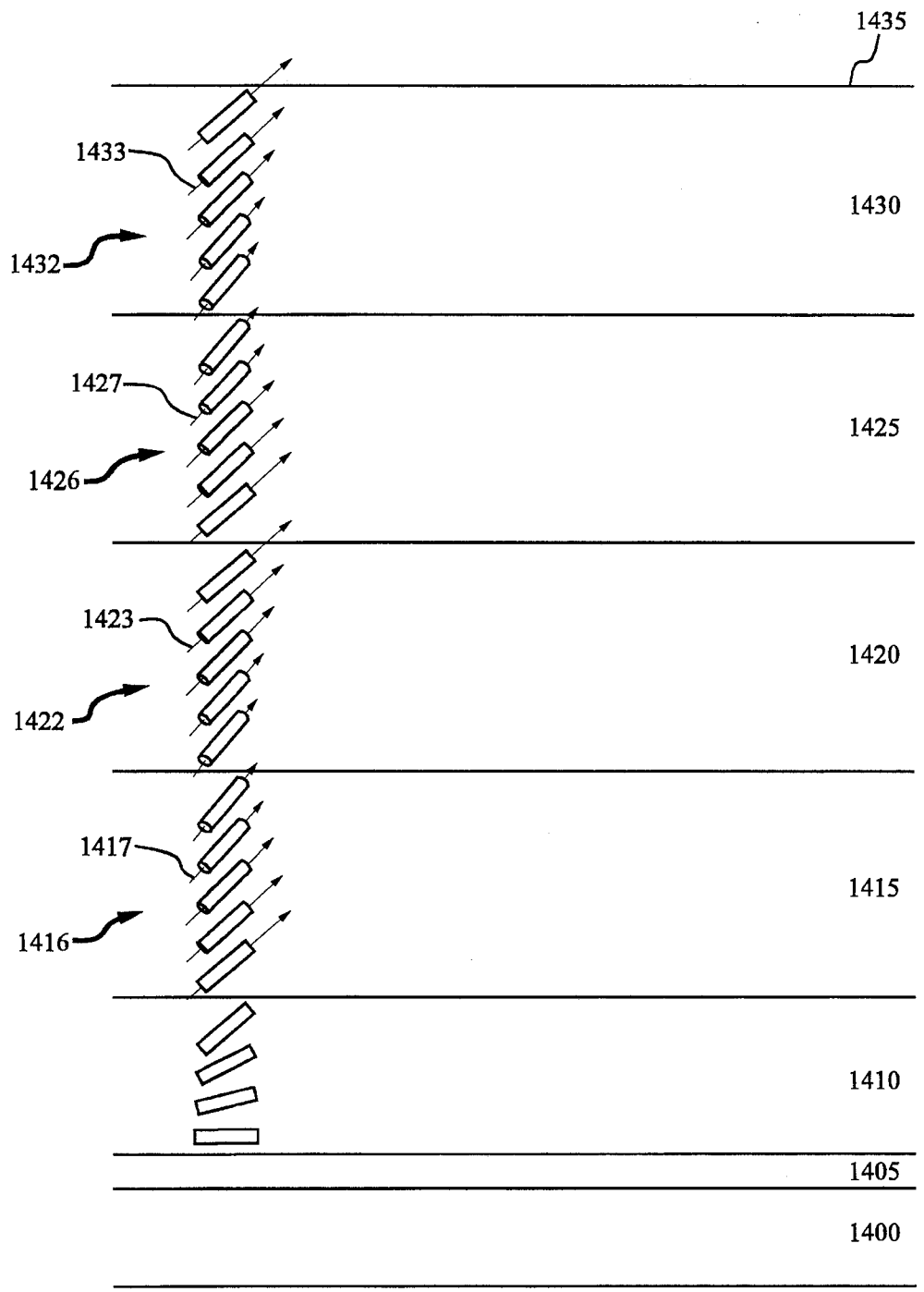
FIG. 14 is a cross-sectional schematic view of one embodiment of a multilayer twisted/splayed O-plate compensator stack produced by polymerization of nematic liquid crystal monomers.

A further illustrative liquid crystal display system, see FIG. 14, includes a rigid glass substrate 1400, an alignment layer 1405, polymerized nematic liquid crystal pretilt layer 1410, polymerized nematic liquid crystal layers 1415, 1420, 1425, and 1430; a liquid crystal/alignment layer interface 1405/1410, liquid crystal/liquid crystal interfaces 1410/1415, 1415/1420, 1420/1425, and 1425/1430; and a liquid crystal/air interface 1435.

The alignment layer 1405, the pretilt layer 1410 and the liquid crystal layer 1415 are produced by methods identical to layers 1205, 1210, and 1215 in the nematic embodiment above with the following exceptions. The liquid crystal in the pretilt layer 1410 is chosen to produce a tilt angle of approximately 40° at the 1410/1415 interface after the liquid crystal layer 1415 is applied. As in the nematic embodiment above, the function of the layer 1410 is to increase the pretilt of the layer 1415 to 40° without altering the azimuthal orientation of the moieties 1416 in the layer 1415. The liquid crystal in the layer 1415 is chosen to produce a tilt angle of 50° at the 1415/1420 interface after it is polymerized, thereby yielding a splay angle of approximately 10° through the layer 1415.

The liquid crystal in the layer 1415 is also doped with a chiral additive so as to have a left handed cholesteric pitch of 24 times the layer thickness of the layer 1415, yielding an approximately 15° twist of the azimuthal orientation of the nematic optical symmetry axis (extraordinary axis) through the layer 1415. This variation in azimuthal orientation occurs about an axis normal to the layer 1415 from top to bottom through the layer 1415. The twisted and splayed structure of the layer 1415 is represented by the liquid crystal side chains or moieties 1416. The variation in the orientation of the optical symmetry axis of the layer 1415 is represented by the arrows 1417 projected from the moieties 1416. As can be seen from FIG. 14, the optical symmetry axis of the layers 1415, 1420, 1425 and 1430 (represented by arrows 1417, 1423, 1427 and 1433) vary through the respective layers 1415, 1420, 1425 and 1430 according to the tilted and azimuthal orientation of the respective moieties 1416, 1422, 1426 and 1432 of the respective layers 1415, 1420, 1425 and 1430.

After the layer 1415 has been polymerized by irradiation with UV light, the layer 1420 is applied over it. The layer 1415 functions to align layer 1420 to the proper azimuthal and pretilt (50°) orientations at the 1415/1420 interface in a manner analogous to the pretilt layer 1410 at the interface 1410/1415. The liquid crystal in the layer 1420 is doped with a chiral additive so as to have a right handed cholesteric pitch of 24 times the thickness of the layer 1420. As such, the layer 1420 will have a twist structure equal in magnitude (15°) yet opposite in sense to that in the layer 1415. Additionally, the layer 1420 will have a splay angle (10°) equal in magnitude to the splay angle of the layer 1415 but opposite in sign, thereby producing a 40° tilt angle in the layer 1420 at the interface 1420/1425.

In this particular embodiment, the layer 1415 is identical to the layer 1425, and layer 1420 is identical to layer 1430. The present invention, however, encompasses a multilayer embodiment in which the magnitude and sign of the tilt, splay and/or twist orientations of the successive and/or alternating layers are different in magnitude and/or in sign. Each successive layer is deposited over the preceding layer after the preceding layer has been cured with UV radiation. Each succeeding layer can be azimuthally aligned and pretilted at the interface by the preceding layer. Other methods of polymerizing the succeeding layers may also be used. These could include thermal cure and other irradiation techniques.

The purpose of producing a layered alternating splay/twist O-plate structure as is described in this embodiment is to yield a compensator which has a biaxial nature, but which has minimum twisting power for polarized light which transits the compensator stack.

5.5 Possible Variations

For each of the previous illustrative embodiments, a number of variations are possible and would be obvious to one skilled in the art of liquid crystal display devices. For example, other possible substrate materials could include non-birefringent polymer films. The polymerizable liquid crystal monomer material may include, as a constituent, molecules that contain two reactive functional groups and therefore can act as cross-linking agents. Other polar tilt angles at the liquid crystal/alignment layer interface can be achieved by suitable selection of reactive liquid crystals, modification of the alignment materials, rubbing conditions, etc. Furthermore, a non-reactive liquid crystal material can be combined with the polymerizable liquid crystal. The resulting liquid crystal polymer film would then have the properties of a plastic or gel. The liquid crystal material could also contain a polymer, liquid crystal polymer, or oligomer that increases the viscosity of the liquid crystal mixture and improves the film forming properties thereof.

Additionally, the various embodiments have been described above with specific pretilt, splay and twist orientations and/or angles, but the present invention is not limited to specific angles or orientations. Finally, the multilayer embodiment has been specifically described with nematic layers but the multilayer embodiment can be of multiple smectic C layers.

6. BIBLIOGRAPHY a. Clerc et al., U.S. Pat. No. 4,701,028.
b. Kahn, The Molecular Physics of Liquid-Crystal Devices, Physics Today, Page 66, May 1982.
c. Macleod, Structure-related Optical Properties of Thin Films, J. Vac. Sci. Technol. A, Volume 4, No. 3, Pages 418–422, 1986.
d. Motohiro and Taga, Thin Film Retardation Plate by Oblique Deposition, Appl. Opt., vol. 28, No. 13, Pages 2466–2482, 1989.
e. Yeh et al., "Compensator for Liquid Crystal Display Having Two Types Of Layers With Different Refractive Indices Alternating", U.S. Pat. No. 5,196,953.

It will be appreciated by those of ordinary skill having the benefit of this disclosure that numerous variations from the foregoing illustration will be possible without departing from the inventive concept described herein. Accordingly, it is the claims set forth below, and not merely the foregoing illustrative embodiments, which are intended to define the exclusive rights claimed in this application program.

What is claimed is:

1. A compensator for a liquid crystal display, wherein:
   (a) said compensator comprises a layer of a birefringent material having an optical symmetry axis defined by a tilt angle, measured relative to the plane of the layer, and a azimuthal angle, measured relative to the plane of the layer;
   (b) said birefringent material comprises a polymer matrix including polymerized nematic material and unpolymerized nematic material;
   (c) each of said tilt angle and said azimuthal angle varies along an axis normal to said layer, said tilt angle limited to values between approximately 25 degrees and approximately 65 degrees; and
   (d) said variations in tilt angle and azimuthal angle being defined by a combination of molecular orientations of said polymerized nematic material and said unpolymerized nematic material.

2. A compensator for a liquid crystal display, said compensator comprising a layer of a birefringent material having an optical symmetry axis defined by a tilt angle, measured relative to the plane of the layer, and an azimuthal angle, measured relative to a reference axis in the plane of the layer, wherein said azimuthal angle varies along an axis normal to said layer, and said tilt angle is substantially fixed at an angle between approximately 25 degrees and approximately 65 degrees, along an axis normal to said layer.

3. A compensator for a liquid crystal display, said compensator comprising a layer of a birefringent material having an optical summetry axis defined by a tilt angle, measured relative to the plane of the layer, and an azimuthal angle, measured relative to a reference axis in the plane of the layer, wherein said tilt angle varies along an axis normal to said layer, and said azimuthal angle is substantially fixed along an axis normal to said layer.

4. A compensator for a liquid crystal display, said compensator comprising a layer of a birefringent material having an optical symmetry axis defined by a tilt angle, measured relative to the plane of the layer, and an azimuthal angle, measured relative to a reference axis in the plane of the layer, wherein each of said tilt angle and said azimuthal angle varies along an axis normal to said layer.

5. The compensator of claim 2, wherein said layer of birefringent material comprises a polymer matrix that defines said variation of the optical symmetry axis, said polymer matrix comprising polymerized nematic material.

6. The compensator of claim 2, wherein said layer of birefringent material comprises a polymer matrix, said polymer matrix including polymerized nematic material and unpolymefized nematic material having respective molecular orientations which, in combination, define said variation of the optical symmetry axis.

7. The compensator of claim 2 further comprising one or more A-plate layers.

8. The compensator of claim 2, further comprising one or more C-plate layers.

9. The compensator of claim 3, wherein said layer of birefringent material comprises a polymer matrix that defines said variation of the optical symmetry axis, said polymer matrix comprising polymerized nematic material.

10. The compensator of claim 3, wherein said layer of birefringent material comprises a polymer matrix, said polymer matrix including polymerized nematic material and unpolymerized nematic material having respective molecular orientations which, in combination, define said variation of the optical symmetry axis.

11. The compensator of claim 3 further comprising one or more A-plate layers.

12. The compensator of claim 3 further comprising one or more C-plate layers.

13. The compensator of claim 4, wherein said layer of birefringent material comprises a polymer matrix that defines said variation of the optical symmetry axis, said polymer matrix comprising polymerized nematic material.

14. The compensator of claim 4, wherein said layer of birefringent material comprises a polymer matrix, said polymer matrix including polymerized nematic material and unpolymerized nematic material having respective molecular orientations which, in combination, define said variation of the optical symmetry axis.

15. A compensator for a liquid crystal display, said compensator comprising a plurality of layers, each layer in accordance with claim 4, wherein the tilt angles of adjacent said layers vary in a positive sense and a negative sense respectively.

16. The compensator of claim 4 further comprising one or more A-plate layers.

17. The compensator of claim 4 further comprising one or more C-plate layers.

18. A compensator for a liquid crystal display, said compensator comprising a plurality of layers, each layer in accordance with a specified one of claims 2, 3, and 4.

19. The compensator of claim 18, wherein (1) the birefringent material in each said layer includes a plurality of moieties of a liquid crystal material, and (2) a specified said layer aligns the moieties of liquid crystal material in an adjacent said layer.

20. The compensator of claim 19 further comprising one or more C-plate layers.

21. The compensator of claim 19 further comprising one or more A-plate layers.

22. The compensator of claim 18 further comprising one or more A-plate layers.

23. The compensator of claim 18 further comprising one or more C-plate layers.

24. A compensator for a liquid crystal display, said compensator comprising a plurality of layers, each layer comprising a birefringent material having an optical symmetry axis defined by a tilt angle, measured relative to the plane of the layer, and an azimuthal angle, measured relative to a reference axis in the plane of the layer, wherein said azimuthal angle varies along an axis normal to said layer, and said tilt angle is substantially fixed at an angle between approximately 25 degrees and approximately 65 degrees, along an axis normal to said layer, wherein the optical symmetry axes of adjacent said layers vary azimuthally in a positive sense and a negative sense respectively.

25. A compensator for a liquid crystal display, said compensator comprising a plurality of layers, each layer comprising a birefringent material having an optical symmetry axis defined by a tilt angle, measured relative to the plane of the layer, and an azimuthal angle, measured relative to a reference axis in the plane of the layer, wherein said tilt angle varies along an axis normal to said layer, and said azimuthal angle is substantially fixed along an axis normal to said layer and wherein the tilt angles of adjacent said layers vary in a positive sense and a negative sense respectively.

26. A compensator for a liquid crystal display, said compensator comprising a plurality of layers, wherein:

(a) each layer comprises a birefringent material including a plurality of moieties of a liquid crystal material;

(b) the optical symmetry axis of each layer has a respective tilt angle, relative to the plane of the layer, which varies along an axis normal to the layer, with the tilt angles of adjacent said layers varying in a positive sense and a negative sense respectively;

(c) the optical symmetry axis of each layer has a respective azimuthal angle, relative to a reference axis in the plane of the layer, which varies along an axis normal to said layer, with the azimuthal angles of adjacent said layers varying in a positive sense and a negative sense respectively; and (d) a specified said layer aligns the moieties of liquid crystal material in an adjacent said layer.

27. A compensator for a liquid crystal display, said compensator comprising a plurality of layers, each layer comprising a birefringent material having an optical symmetry axis defined by a tilt angle, measured relative to the plane of the layer, and an azimuthal angle, measured relative to a reference axis in the plane of the layer, wherein each of said tilt angle and said azimuthal angle varies along an axis normal to said layer, and wherein the optical symmetry axes of adjacent said layers vary azimuthally in a positive sense and a negative sense respectively.

28. A liquid crystal display for viewing at various angles with respect to a normal axis perpendicular to the display, comprising:

(a) (a) a polarizer layer;

(b) (b) an analyzer layer;

(c) (c) a liquid crystal layer disposed between the polarizer layer and the analyzer layer;

(d) (d) a first electrode proximate to a first major surface of the liquid crystal layer;

(e) (e) a second electrode-proximate to a second major surface of the liquid crystal layer, the first and second electrodes being adapted to apply a voltage across the liquid crystal layer when the electrodes are connected to a source of electrical potential; and (f) (f) a compensator in accordance with a specified one of claim 1, 5, 6, 2, 3, 4, 24, 28, 26, 7, 8, 9, 13, 10, 14, 27, 15, 11, 16, 12 and 17 disposed between the polarizer layer and the analyzer layer.

29. The liquid crystal display of claim 28, wherein said compensator is optically matched with said liquid crystal layer to provide a desired viewing characteristic over a specified field of view.

* * * * *

UNITED STATES PATENT AND TRADEMARK OFFICE
CERTIFICATE OF CORRECTION

| | | |
|---|---|---|
| PATENT NO. | : 5,619,352 | Page 1 of 1 |
| APPLICATION NO. | : 08/690033 | |
| DATED | : April 8, 1997 | |
| INVENTOR(S) | : Gene C. Koch et al. | |

It is certified that error appears in the above-identified patent and that said Letters Patent is hereby corrected as shown below:

IN THE CLAIMS:

Column 18, Line 20, Claim 3, "summetry" should be --symmetry--.

Column 20, Line 45, Claim 28, "28" should be --25--.

Signed and Sealed this

Seventh Day of October, 2008

JON W. DUDAS
*Director of the United States Patent and Trademark Office*

(12) EX PARTE REEXAMINATION CERTIFICATE (9077th)
United States Patent
Koch et al.

(10) Number: US 5,619,352 C1
(45) Certificate Issued: Jun. 19, 2012

(54) LCD SPLAY/TWIST COMPENSATOR HAVING VARYING TILT AND/OR AZIMUTHAL ANGLES FOR IMPROVED GRAY SCALE PERFORMANCE

(75) Inventors: Gene C. Koch, Swisher, IA (US); Bruce K. Winker, Moorpark, CA (US); William J. Gunning, III, Newbury Park, CA (US)

(73) Assignee: Chimei Innolux Corporation, Chu-Nan, Miao County (TW)

Reexamination Request:
No. 90/011,196, Aug. 30, 2010

Reexamination Certificate for:
Patent No.: 5,619,352
Issued: Apr. 8, 1997
Appl. No.: 08/690,033
Filed: Jul. 31, 1996

Related U.S. Application Data

(63) Continuation of application No. 08/313,476, filed on Sep. 30, 1994, now abandoned, which is a continuation-in-part of application No. 08/223,251, filed on Apr. 4, 1994, now Pat. No. 5,504,603.

(51) Int. Cl.
*G02F 1/1333* (2006.01)
*G02F 1/1335* (2006.01)

(52) U.S. Cl. ............................ 349/89; 349/117; 349/119
(58) Field of Classification Search ........................ None
See application file for complete search history.

(56) References Cited

To view the complete listing of prior art documents cited during the proceeding for Reexamination Control Number 90/011,196, please refer to the USPTO's public Patent Application Information Retrieval (PAIR) system under the Display References tab.

*Primary Examiner* — Robert Nasser

(57) ABSTRACT

A twisted/splayed O-plate compensation device, in accordance with the invention, is comprised of an organic liquid crystal polymer thin film and possibly one or more other birefringent layers. The O-plate thin film is a birefringent medium with its optical symmetry axis, on average, oriented obliquely with the surface of the film. Within this constraint, the direction of the material's optical symmetry axis is allowed to vary continuously along the axis normal to the film surface. Such films may be fabricated by applying thin layers of chiral doped nematic or semectic liquid crystal monomer solutions in inert solvents to transparent substrates. The carrier solvents are then evaporated and the monomers polymerized by UV irradiation. Compensation devices may also be comprised of multiple layers of twisted/splayed O-plate material in conjunction with A-plates, C-plates, and simple O-plates. Fabrication techniques for twisted/splayed O-plates are described.

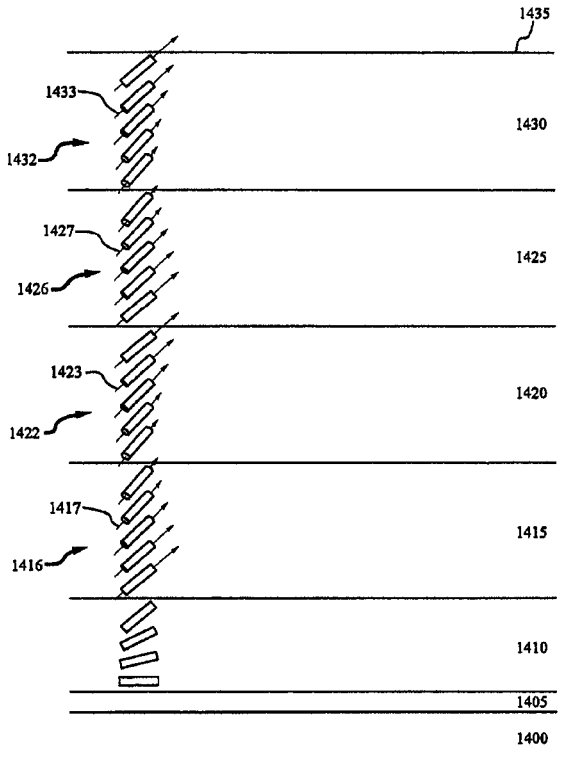

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 3, 12, 28 and 29 is confirmed.

Claims 1-2, 4-11 and 13-27 were not reexamined.

* * * * *